INVENTOR.
Henry Magnuski
BY Mueller & Aichele
Attys

COMMUNICATION SYSTEM

Filed March 22, 1962 3 Sheets-Sheet 2

INVENTOR.
Henry Magnuski
BY Mueller & Aichele
Attys.

Dec. 13, 1966 H. MAGNUSKI 3,292,178

COMMUNICATION SYSTEM

Filed March 22, 1962 3 Sheets-Sheet 3

INVENTOR.
Henry Magnuski
BY Mueller & Aichele
Attys.

United States Patent Office 3,292,178

Patented Dec. 13, 1966

3,292,178

COMMUNICATION SYSTEM

Henry Magnuski, Glenview, Ill., assignor to Motorola, Inc., Chicago, Ill., a corporation of Illinois Filed Mar. 22, 1962, Ser. No. 181,554
20 Claims. (Cl. 343—203)

This invention relates generally to radio communication systems, and more particularly to a random access system wherein a plurality of communications can take place simultaneously between many different transmitters and receivers of the same type operating in the same geographical area over a single wide band channel.

Various techniques have been used to provide a plurality of communications on a single wide band channel. One technique is to divide the wide band channel into a plurality of different narrow bands and to use known equipment with a switching arrangement to switch from one channel to another. In such techniques using narrow bands a given frequency range is reserved for each communication and this frequency range is not used when this one communication is not operating. Accordingly, full utilization of the channel space does not take place. It has also been proposed to use the entire wide band channel for a plurality of simultaneous communications in two ways, by time sharing with pulses interspersed, or by continuously transmitting coded RF energy distributed through the entire band. This last technique does not provide enough dynamic range and strong signals from nearby transmitters tend to block weak signals from distant transmitters.

An object of the present invention is to provide a random access communication system wherein maximum utilization of a wide band channel takes place.

A further object of the invention is to provide a random access system wherein reliable two-way communication is provided by small portable units of simple construction.

Another object of the invention is to provide a random access system wherein the coded pulses are transmitted so that during transmissions from a plurality of stations the interference to a receiver which is receiving weak signals is minimized.

A feature of the invention is the provision of a communication system using delta modulation with the pulses from each transmitter being coded so that each pulse includes an address which can be distinguished by the receivers operating in the system.

A further feature of the invention is the provision of a coded delta modulation system wherein each modulation pulse is formed by a plurality of pulse components which may have different frequencies and different time spacings to provide a large number of different codes or addresses.

A still further feature of the invention is the provision of a receiver for use in a coded delta modulation system wherein the receiver includes a plurality of oscillators which are gated to apply pulses of local oscillations to the receiver mixer in a predetermined sequence so that pulses of a single intermediate frequency are produced when the desired address combination is received.

Another feature of the invention is the provision of a system wherein pulses are transmitted at a fixed uniform rate and wherein the receiver is gated to receive signals only during the time slots or periods during which signals may be received, so that the receiver is gated to reject signals during the greater part of the time to eliminate a large precent of interference.

Still another feature of the invention is the provision of a receiver for a coded delta modulation system including automatic frequency control and automatic gain control circuits which are responsive to the weakest received pulse components in the desired pulse group to provide optimum operation under the most adverse conditions.

A further feature of the invention is the provision of a coded delta modulation communication system wherein the repetition rate of the decoding pulse groups at the receiver address decoding system is slightly different than the timing of the pulse groups at the transmitter so that coincidence of pulse groups will take place, and the receiver includes an automatic frequency control system for holding the decoding pulse groups in step with the received coded pulse groups.

The invention is illustrated in the drawings wherein.

In accordance with the invention a communication system is provided including a transmitter for transmitting a train of pulses, which may include a delta modulator for producing such train of pulses from voice transmission. Any other source of pulses such as data pulse transmission may be applied to the transmitter. The transmitter includes coding means for providing coded pulse groups so that each pulse has an address. This includes means for producing waves of different frequencies and gating means for selectively applying the waves to form a coded pulse group. The gating means are controlled by timing means which position the pulse components in different time slots to provide coded pulse groups. For each pulse from the delta modulator, a coded pulse group is transmitted, which may include waves of different frequencies and in different time slots within the pulse group for different addresses. The system includes a receiver having a mixer to which the received waves are applied, and a plurality of oscillators coupled to the mixer through gates. The gates are controlled by timing means to apply local oscillations to the mixer so that when a particular pulse group is received, the local oscillations will be of the required frequency and in the required time slots so that pulses of a single intermediate frequency are produced at the mixer output. A detector is provided for responding to the received pulse group, and detected pulses are applied through an audio processing circuit to an audio amplifier and reproducer. The detected pulse train from the detector may be applied to any data system which responds to the pulse train transmitted. When standing by, the receiver timing means produces pulse groups which are applied to the receiver gates having a repetition rate slightly less than that applied to the transmitter gates so that the time slots of the receiver will slide with respect to the received pulse groups until coincidence between the time slots and the pulse groups takes place. An automatic frequency control circuit is provided in the receiver for holding the receiver time slots in coincidence with received pulse groups. An automatic gain control circuit is also provided in the receiver and both the automatic frequency control and the automatic gain control circuits respond to the weakest pulse in the desired group to prevent strong interfering pulses from taking control of the automatic frequency and gain control circuits.

Figure 1:
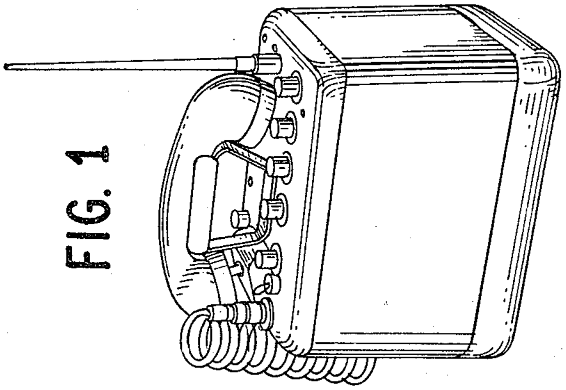
FIG. 1 shows a transmitter-receiver unit in accordance with the invention.

Referring now to the drawing, in FIG. 1 there is illustrated a unit in accordance with the invention. This is arranged as a portable unit and includes batteries, but the same unit without batteries can be installed in a vehicle or used with a fixed power supply as may be desired. The unit is small in size, being about eight inches high, nine inches long and five inches wide. The handset, antenna and controls extend from the top of the unit as is apparent from FIG. 1.

Figure 2:
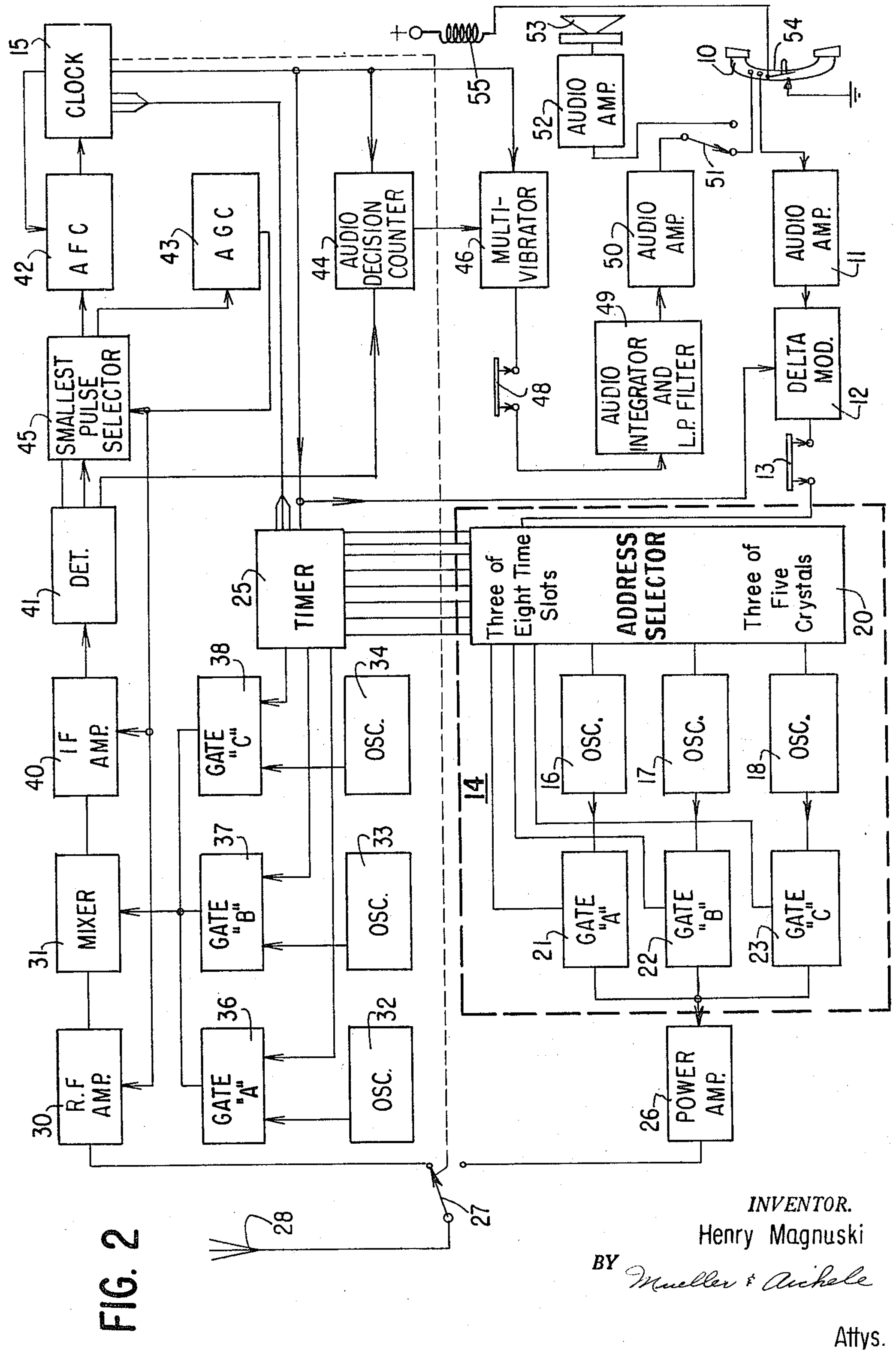
FIG. 2 is a block diagram of the transmitter and receiver system of the invention.

A block diagram of the system is shown in FIG. 2, the system being illustrated for voice communication. As will be more fully pointed out, the system may be used for transmission of any pulse train and is not limited to voice communication. In the system of FIG. 2, the handset 10 includes a microphone for applying signal to audio amplifier 11. The audio signals are applied to delta modulator 12 which produces output pulses which are either present or absent to provide a pulse train. Delta modulation is known in the art, one such system being described in an article by F. de Jager in Phillips Research Report #7, 1952.

Figure 3:
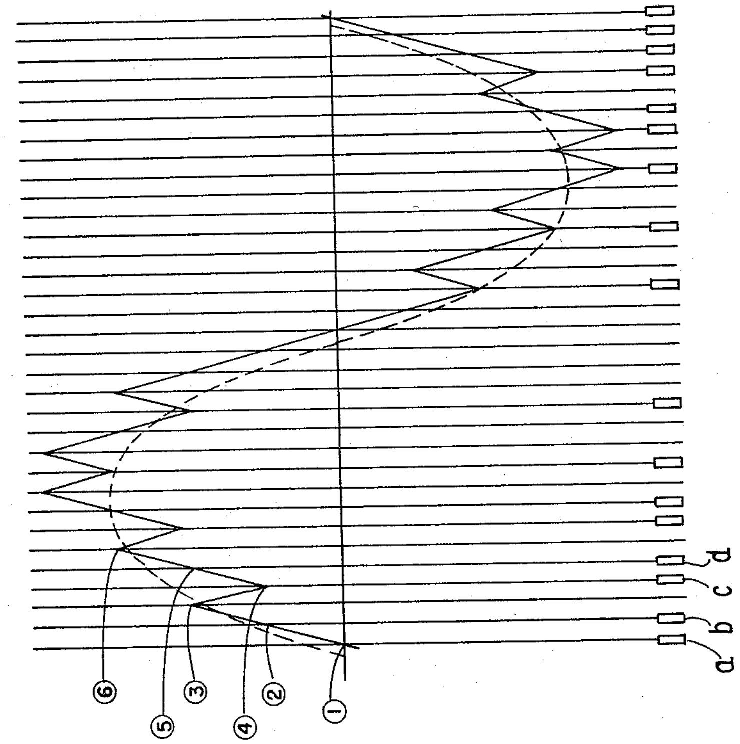
FIG. 3 illustrates the delta modulation used in the system of FIG. 2.

FIG. 3 illustrates the operation of such a delta modulation system wherein the dotted curve shows the audio signal to be transmitted and the solid curve shows the delta modulation representation of such signal. The reproduced signal is formed by a series of fixed slope segments, with the slope of each segment being either positive or negative. In the delta modulation system a pulse is transmitted each time the reproduced curve falls below the actual curve to produce a rising slope in the reproduced curve. Referring to FIG. 3, at point 1, which is a particular point in time, the solid curve is below the dotted curve so the pulse *a* is transmitted and the solid curve rises at a fixed slope. At time 2 the solid curve is still below the dotted curve and a second pulse *b* is transmitted. At time 3 the solid curve is above the dotted curve so no pulse is transmitted and the reproduced curve has a negative slope. At time 4 the solid curve is again below the dotted curve so that pulse *c* is transmitted. Again at time 5 the solid curve is below the dotted curve so pulse *d* is transmitted. At time 6 the solid curve is above the dotted curve and there is no transmitted pulse, and the reproduced curve has a negative slope in such case.

It will be apparent by comparing the solid and dotted curves, and the pulses shown in FIG. 3, that the delta modulation provides a reproduced curve closely following the curve of the transmitted wave by using the presence and absence of pulses to control the increments of the reproduced curve. The pulses appear only at predetermined regularly spaced times so that it is only necessary to transmit a pulse or no pulses at regular intervals to provide the reproduced wave form.

Returning to FIG. 2, the pulses from modulator 12 are applied through jack 13 to the transmitter address or coding system 14. The jack 13 is provided to permit the insertion of a cryptic or secrecy device which may scramble the pulses to prevent undesired reception of information contained thereon. Alternatively, a pulse train from any system other than the delta modulator 12, such as a data system, may be applied at jack 13 to replace pulses generated by voice. The system is therefore suitable for transmitting pulse trains for any desired application.

The address or coding system includes oscillators 16, 17 and 18 which provide waves of different frequencies. The oscillators may be coupled to a selecting unit 20 for switching the three oscillators to different crystals so that the frequency produced by each of the three oscillators can be set to one of several predetermined values. For example, five different frequencies may be used. The oscillators are coupled respectively to gates 21, 22 and 23 and continuously apply waves to the three different frequencies to these gates.

A timing unit 25 is coupled to the three gates 21, 22 and 23 through the selecting unit 20. The gates are arranged so that the wave applied thereto from oscillators 16, 17 and 18, are passed by each gate when a pulse is applied to such gate by the selector unit 20. The selector unit applies pulses to open the gates when a pulse is simultaneously applied by the modulator 12 and the timing unit 25. The waves are applied from the gates to power amplifier 26 which is coupled through switch 27 to the antenna 28.

Figure 4:
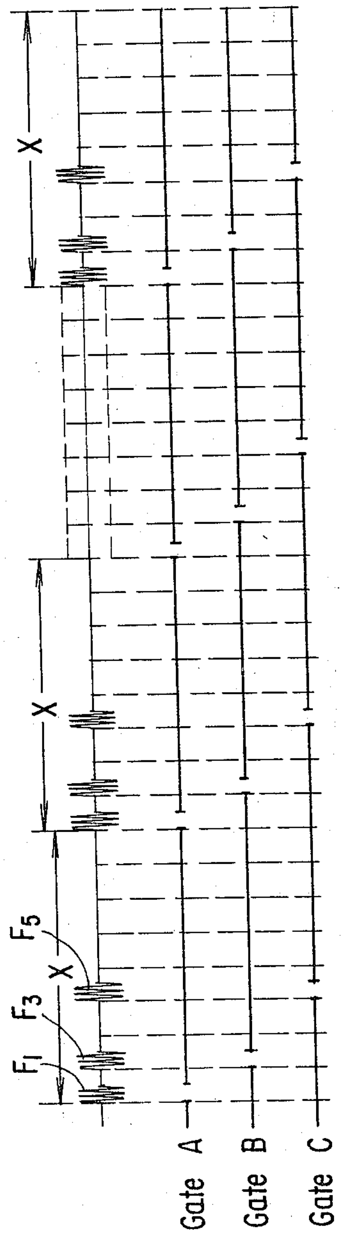
FIG. 4 illustrates the coded delta modulation pulses utilized in the system of the invention.

The operation of the timer 25 and selector 20 will be apparent from a consideration of FIG. 4. For each pulse applied from the modulation source, the selector unit 20 applies a pulse group having a plurality of pulse components. The timing unit establishes a plurality of time slots for each pulse group, such as eight slots shown in FIG. 4. The selector unit then selects three of these time slots and pulses are applied to the gates to open each during one of the time slots. For example, for each pulse from the delta modulator, the pulse group X shown in FIG. 4 may be produced. The selector unit 20 applies a pulse to gate A to open this gate for the time slot in each group X shown opposite the designation gate A in FIG. 4. This applies the frequency from oscillator 16 which is designated in FIG. 4 as $F_1$. The selector unit 20 will then apply a pulse to gate B to open this gate during the second time slot also shown in FIG. 4. The wave from oscillator 17 designated $F_3$ will then be applied by the transmitter. Similarly, the selector unit 20 will apply pulses to gate C during the time slots shown in FIG. 4 to apply waves from oscillator 18 which are designated $F_5$ in FIG. 4.

It is noted that the three pulse components in each group are not in adjacent time slots but are in the first, second and fourth of the eight time slots. This timing of the pulse components is controlled by the selector unit 20, and pulse components can be in any three of the eight time slots in the system described. Also, the pulse components do not take up the entire time slots and there is an interval between the pulse components $F_1$ and $F_3$ which are in adjacent time slots. This spacing is provided so that the transmitted pulses can be short and the receiver gates can be open only a very short time to thereby minimize interference. Also the time space between pulse components makes it easier to distinguish the components forming an address. As previously stated, the frequencies of the waves from the oscillators can be changed and by changing the frequencies and time spacings a large number of different addresses can be provided.

The timing unit 25 and the delta modulator 12 are both controlled by the clock 15, so that each pulse group from the selector unit 20 is applied during a single pulse from the modulator 12. Accordingly, the gates 21, 22 and 23 will be operated during the time periods A, B and C which are parts of each pulse group, to code or address each pulse from the modulator. The delta modulator 12 controls the address selector so that a pulse group is applied to the gates only when a pulse is produced by the delta modulator.

Considering now the receiver of the system of FIG. 2, signals picked up by antenna 28 are applied through switch 27 to the radio frequency amplifier 30. The amplified signals from amplifier 30 are applied to mixer 31. For providing local oscillation to mixer 31, three oscillators 32, 33 and 34 are provided. The oscillators 32, 33 and 34 are coupled to mixer 31 through gates 36, 37 and 38 respectively. These gates are controlled by the timing unit 25 which applies pulses to the gates 36, 37 and 38 to render them operative at regular time slots to apply waves from the oscillators 32, 33 and 34 to the mixer 31.

In general, each receiver will have a fixed address, that is the time slots during which the gates 36, 37 and 38 are opened and the frequencies of the oscillators 32, 33 and 34 are fixed. Of course the time slots and the frequencies can be changed to change the address of a receiver.

The frequencies of the oscillators 32, 33 and 34 are selected so that when the pulse group of the particular receiver address is applied to the mixer the output pulses will be of the same intermediate frequency for each pulse component of the group. These output pulses are applied to intermediate frequency amplifier 40 which is tuned to a single predetermined intermediate frequency. When the timing and frequencies of the received pulses correspond to the address of a particular receiver the pulses at the output of the mixer will be of the proper frequency to be selected by the intermediate frequency amplifier 40 and applied to detector 41. Received pulses in different time slots will not be translated by the mixer, and if they are of different frequencies they will not be selected by the amplifier 40.

The detector 41 is constructed to respond to the received pulse group which, in the example given, includes three pulse components as previously stated. The detected pulses are applied to an automatic frequency control circuit 42 and an automatic gain control circuit 43 through the smallest pulse selector 45. The pulses are also directly applied to decision counter 44. The counter 44 counts the pulses in each coded group received, and if all three pulses in the group are present and detected the counter will count to three to indicate that the address is received. In such case a pulse is sent from the counter to the multivibrator 46. If the count is less than three no pulse is sent and the counter is reset by action of the clock 15.

The multivibrator 46 restores the pulse train which is transmitted. This pulse train is applied to jack 48 to which cryptic or secrecy equipment can be connected, or to which data equipment can be connected which responds to the received pulse train. The pulses from jack 48 are applied either with or without unscrambling to audio processing circuit 49 which reconstructs the audio signal from the pulse train, which in the case illustrated may be a delta modulation signal. The reconstructed audio signal is applied through audio amplifier 50 to the receiver of the handset 10. Alternatively, the switch 51 may be operated to apply the audio signal to audio amplifier 52 and to loudspeaker 53. The loudspeaker 50 is included in the unit shown in FIG. 1, with the switch 48 selectively connecting the loudspeaker 50 when the handset 10 is on the support to provide either a voice or tone alarm for signalling purposes. In general voice is used so that the operator of the receiver knows the station calling and can set the address selector at his unit so that his transmission is coded to be received by the transmitting station.

The clock 15 controls the rate of repetition of the pulse groups applied from the timing unit 25 to the transmitter gates and to the receiver gates. The clock is controlled by push-to-talk switch 54 in the handset 10 to change the clock frequency during transmission and reception. This may be accomplished through action of relay 55 coupled to the antenna switch 27 and to the clock 15. When the receiver is in standby condition, waiting to receive a signal, the clock frequency may be 320,000 cycles. When the push-to-talk switch 54 is operated for transmission, the clock frequency is changed to 320,400 cycles. This difference in frequency is to permit the time slots provided by the receiver to slide into coincidence with the pulse groups received from a transmitter. When the receiver time slots are positioned so that the pulse groups fall therein, and the address is recognized by the receiver, the automatic frequency control circuit 42 operates to increase the frequency of clock 15 to 320,400 cycles so that it is in synchronism and in phase with the pulse groups being received.

The automatic gain control circuit 43 controls the gain of radio frequency amplifier 30 and intermediate frequency amplifier 40 to provide the desired signal level at the detector 41. The automatic frequency control circuit 42 and the automatic gain control circuit 43 are both controlled from the detector 41 through the smallest pulse selector 45, and respond to the smallest of the pulse components in a received pulse group. This is necessary since disturbances may occur at the time of received pulses, and control of the frequency and gain by a disturbance would produce errors in the reproduction.

Figure 5:
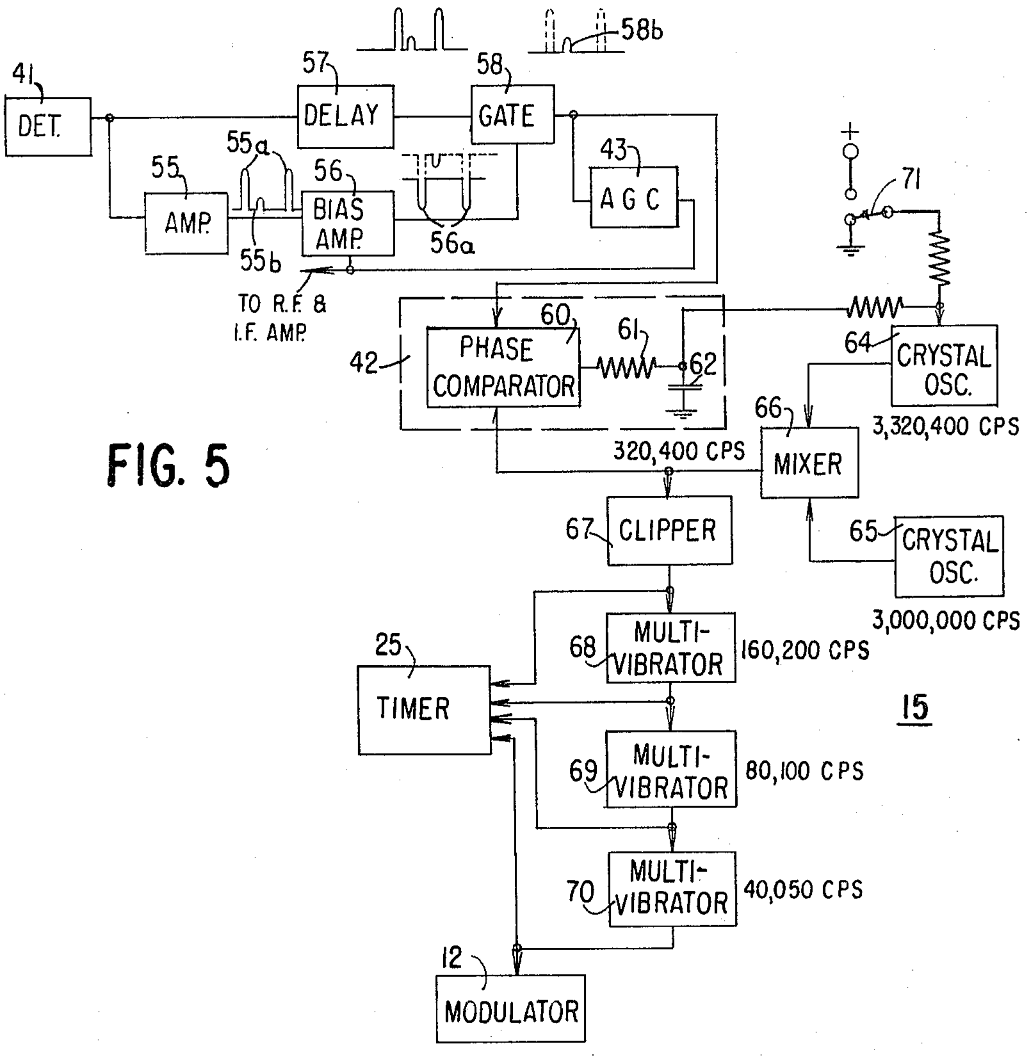
FIG. 5 illustrates in more detail the smallest pulse detector, automatic frequency control system and clock, in the system of FIG. 2.

The operation of the weakest signal selector and of the clock and automatic frequency control circuit is shown in FIG. 5. Pulses from detector 41 are applied to amplifier 55 where the level is increased. In the operation of the system described, when the receiver gates are open, disturbances may be present with the received pulses to cause high amplitude pulse components represented at 55*a*. The pulse component 55*b* which is not accompanied by disturbances may be much smaller, and it is necessary that this pulse component be held at the required level to operate the counter. The output of amplifier 55 is applied to bias amplifier 56 which produces an output only when the input exceeds a particular signal level. The amplifier 56 is adjusted so that it will produce output pulses 56*a* corresponding to input pulse 55*a*, but there will be no output pulse corresponding to input pulse 55*b* which is below the particular level.

The signal from detector 41 is also applied through a delay circuit 57 to gate 58. The delay circuit need provide only small delay and is therefore a simple circuit. The pulses from amplifier 56 control the gate 58 to reduce the gain or completely cut off the signal so that the large pulse components from detector 41 are reduced in amplitude or completely eliminated. This allows the smallest pulse to pass to provide an output pulse 58*b*, and this is used to control automatic frequency control circuit 42 and automatic gain control circuit 43.

The control voltage from the automatic gain control circuit 43 is applied to the bias amplifier 56 to control the reference level thereof. This causes the bias amplifier to respond to input pulses of a particular level to provide gating pulses which control the transmission of pulses from the detector 41 to the automatic gain and frequency control circuit. The control voltage from the automatic gain control circuit is also applied to the RF and IF amplifiers of the receiver, as shown in FIG. 2.

The automatic frequency control circuit 42 is shown in FIG. 5 as including a phase comparator 60 and a time constant circuit including resistor 61 and capacitor 62. The clock 15 includes crystal oscillators 64 and 65, mixer 66, clipper 67 and multivibrators 68, 69 and 70. The crystal oscillators and mixer provide a stable clock frequency which may be controlled, both manually and by the automatic frequency control circuit. As an example, the oscillator 64 may be a crystal controlled oscillator having a normal frequency of 3,320,400 cycles per second. The oscillator 65 may also be crystal controlled and provide a frequency of 3,000,000 cycles per second. The mixer 66 provides the difference frequency or 320,400 cycles per second as the clock frequency. This mixer output is of sinusoidal waveform and is applied to phase comparator 60 and clipper 67.

The phase comparator 60 may be of the type used in television receivers to synchronize a sine wave with a pulse wave and to hold the sine wave in a precise phase relation to the pulse wave. The output of the time constant circuit controls the frequency of oscillator 64 to hold the mixer output at the desired frequency and phase. Since the change in frequency required to provide the control is relatively small as compared to the frequency of oscillator 64, this control can be easily accomplished.

The square wave output of clipper 67 is applied to multivibrator 68 which divides the frequency by 2 to produce a square wave output at 160,200 cycles per second. This output is divided by multivibrator 69 to provide 80,100 cycles per second and again divided by multivibrator 70 to provide an output of 40,050 cycles per second. This latter frequency is used as the sampling frequency of the delta modulator 70, and is also applied to the audio decision counter 44 and multivibrator 46 in the system of FIG. 2.

The various outputs of the multivibrator divider chain are applied to timer 25 to provide the time intervals required to set up the eight time slots applied to the address selector 20 in the system of FIG. 2. Also, the three selected time slots for the receiver address are made available from these outputs. These time slots are easily provided by diode coincidence circuits coupled to the output of clipper 67 and the outputs of multivibrators 68, 69 and 70.

As previously stated the repetition rate for the pulse groups is different during transmission and when the receiver is in standby condition waiting to receive a signal. In the standby condition, the frequency of oscillator 64 is reduced to 3,320,000 cycles so that the repetition rate of the pulse groups which produce the receiver time slots is reduced from 40,050 cycles to 40,000 cycles. This is accomplished by operating switch 71 to apply a control voltage to oscillator 64 to change its frequency. The switch 71 may be controlled by the relay 55 of FIG. 2. Accordingly, the time slots of the receiver will repeat slower than the received pulse groups and will in effect slide until the received pulse groups fit in the receiver time slots. When this happens the output of phase comparator will provide a voltage to oscillator 64 to counteract the fixed voltage so that the frequency of oscillator 64 is increased until the repetition rate of the slots of the receiver is the same as the repetition rate of the received pulse groups. In the system described this will require that the frequency of oscillator 64 be increased to 3,320,400 cycles to provide a slot repetition rate of 40,050 cycles.

It is pointed out that pulses of waves will be applied to the intermediate frequency amplifier 40 of the receiver of FIG. 2 only when one of the gates 36, 37, or 38 is operated to apply local oscillations to the mixer 31, and the amplifier 40 will respond only to those waves which are of the frequency to which amplifier 40 is tuned. In the system illustrated, these gates are open only during the three time slots providing the address of a particular receiver. The intermediate frequency amplifier 40 will therefore exclude signals at all other times so that signals addressed to other receivers which may be picked up by the receiver, and noise generated in the stages of the receiver ahead of the intermediate frequency amplifier 40, will not be passed by the intermediate frequency amplifier to the detector 41. The pulses are received at fixed time slots so the gates may be very narrow, providing transmission of signals only for intervals having the same duration as the pulse components. This is very effective in reducing noise or disturbances from other communications operating on the same wide band channel.

In random access systems wherein the same channel is used for many transmissions there is a possibility that the address of a receiver may be received as a composition of a plurality of interfering signals. This type of address is called an error. The system of the invention is advantageous because it minimizes the errors due to the short time slots used as explained above. In addition, the error received in the system of the invention causes negligible disturbance of the audio output signal. If the error occurs at the time when a pulse is transmitted, which is during one-half of the periods that the system is gated, then there is no effect whatsoever in the reproduced signal. Therefore, only half of the errors will have any effect on the reproduction. When the error occurs at a time that the system should not receive a pulse, this causes a change of only two increments in the reproduced delta modulation signal. That is, instead of the wave having a single negative slope sector, the wave will be replaced by a single positive slope sector by the error. Accordingly there will be a change of only two increments in the output. This is not a substantial change in the signal such as would be produced by an error when each pulse provides the full signal information at any instant.

The receiver of the invention is relatively simple since duplication of receiver components, other than the local oscillator, is not required. Further, the timing circuit is simplified and requires no delay line for providing coincidence of the coded or address pulses. The timing can be provided by a simple circuit and the independent decision on each pulse is reached on a digital basis permitting the use of simple logic circuits in the detecting system instead of analog circuits such as delay lines.

As previously stated, security provisions can be easily included because digital transmission is utilized. Any scrambling or other cryptic unit can be connected at the jack provided on the transmitter, with a similar unit being provided at the jack provided on the receiver. Accordingly, no changes in the system itself are required when security provisions are added.

The system of the invention has the further advantage that when the communication range is inadequate, the range can be increased by the use of simple repeater or relay stations. Because of the digital signal utilized, the signal can be repeated without adding noise inasmuch as a clean or noise free signal can be applied to the transmitter of the relay when a signal is received at the receiver thereof. There is no requirement for changing frequency at the relay so that any station in the system can receive either from the original transmission or the relayed transmission without any adjustment or change in the equipment.

I claim:

1. A communication system including in combination, transmitter means including means for providing a train of pulses having a regular timed relation with the presence and absence of such pulses constituting the information to be transmitted, a plurality of oscillators for producing waves of different frequencies, a plurality of gates individually coupled to said oscillators for controlling the transmission of said waves therefrom, selector means coupled to said gates producing recurring pulse groups with each group corresponding to a pulse of said train and including a plurality of pulse components in predetermined time positions, means applying each of said pulse components to one of said gates for operating the same to transmit waves from the associated oscillator, whereby a coded pulse group is transmitted including pulse components of different frequencies and in predetermined time positions to form an address, and receiver means including a mixer for receiving transmitted waves, a plurality of local oscillators for producing waves related in frequency to the frequencies of the pulse components of the coded pulse group forming a particular address, a plurality of receiver gates individually coupling said oscillators to said mixer, timing means coupled to said receiver gates for operating the same at predetermined times corresponding to the time positions of the components of the coded pulse group forming the particular address, a fixed tuned intermediate frequency amplifier coupled to said mixer for producing an output only when the received wave and the oscillations coupled to said mixer have a predetermined frequency relation, detector means coupled to said intermediate frequency amplifier for producing a pulse in response to reception of each pulse component of the coded pulse group forming the particular address, and counter means coupled to said detector means for producing a signal when all pulse components of a pulse group are received.

2. A communication system including in combination, transmitter means including means for providing a train of pulses having a regular timed relation with the presence and absence of such pulses constituting the information to be transmitted, a plurality of oscillators for producing waves of different frequencies, a plurality of gates individually coupled to said oscillators for controlling the transmission of said waves therefrom, selector means coupled to said gates producing recurring pulse groups with each group corresponding to a pulse of said train and including a plurality of pulse components in predetermined time positions, means applying each of said pulse components to one of said gates for operating the same to transmit waves from the associated oscillator, whereby a coded pulse group is transmitted including pulse components of different frequencies and in predetermined time positions to form an address, and receiver means including a mixer for receiving transmitted waves, a plurality of oscillators for producing waves related in frequency to the frequencies of the pulse components forming a particular address, a plurality of receiver gates individually coupling said oscillators to said mixer, timing means coupled to said receiver gates for operating the same at predetermined times corresponding to the time positions of the particular address, a fixed tuned intermediate frequency amplifier coupled to said mixer for producing an output only when the received wave and the oscillations coupled to said mixer have a predetermined frequency relation, detector means coupled to said intermediate frequency amplifier for producing a pulse in response to reception of each pulse component of the coded pulse group forming the address, counter means coupled to said detector means for producing a signal when all pulse components of a pulse group are received, said counter means being coupled to said timing means and being reset thereby at the end of each pulse group, and means coupled to said counter means for producing a train of pulses corresponding to the train of pulses provided at the transmitter.

3. A communication system including in combination, transmitter means including means for providing train pulses having a regular timed relation with the presence and absence of such pulses constituting the information to be transmitted, a plurality of oscillators for producing waves of different frequencies, a plurality of gates individually coupled to said oscillators for controlling the transmission of said waves therefrom, selector means coupled to said gates producing recurring pulse groups with each group corresponding to a pulse of said train and including a plurality of pulse components in predetermined time positions, means applying each of said pulse components to one of said gates to operate the same to transmit waves from the associated oscillator, whereby a coded pulse group is transmitted including pulse components of different frequencies, and receiver means including a mixer for receiving transmitted waves, a plurality of oscillators for producing waves related in frequency to the pulse components of a particular coded pulse group transmitted, a plurality of receiver gates individually coupling said oscillators to said mixer, timing means coupled to said receiver gates for operating the same, said receiver timing means operating said gates at a repetition rate differing from the repetition rate of the pulse groups transmitted, a fixed tuned intermediate frequency amplifier for producing an output only when the received wave and the oscillations coupled to said mixer have a predetermined frequency relation, detector means coupled to said intermediate frequency amplifier for producing a pulse in response to reception of the particular coded pulse group, and automatic frequency control means coupled to said detector means and to said timing means for holding the operation of said gates in synchronization with the received coded pulse groups.

4. A communication system including in combination, transmitter means including means for providing a train of pulses having a regular time relation, with the presence of such pulses constituting the information to be transmitted, a plurality of oscillators for producing waves of different frequencies, a plurality of gates individually coupled to said oscillators for controlling the transmission of said waves therefrom, means coupled to said gates producing recurring pulse groups with each group corresponding to a pulse of said train and including a plurality of pulse components in predetermined time positions, each of said pulse components causing operation of one of said gates to transmit waves from the associated oscillator, whereby a coded pulse group is transmitted including pulse components of different frequencies, and receiver means including a mixer, a radio frequency amplifier for applying received waves to said mixer, a plurality of oscillators for producing waves related in frequency to the pulse components of particular coded pulse group transmitted, a plurality of receiver gates individually coupling said oscillators to said mixer, timing means coupled to said receiver gates for operating the same, said receiver timing means opening said gates at a repetition rate differing from the repetition rate of the pulse groups transmitted, a fixed tuned intermediate frequency amplifier for producing an output when the received wave and the oscillations coupled to said mixer have a predetermined frequency relation, detector means coupled to said intermediate frequency amplifier for producing a pulse in response to reception of the particular coded pulse groups, automatic frequency control means coupled to said detector means and to said timing means for operating said receiver gates in synchronization with the received coded pulse groups, and automatic gain control means coupled to said detector means for controlling the gain of said radio frequency amplifier and said intermediate frequency amplifier.

5. A communication system including in combination, transmitter means including means for providing a train of pulses having a regular time relation with the presence and absence of such pulses constituting the information to be transmitted, a plurality of oscillators for producing waves of different frequencies, a plurality of gates individually coupled to said oscillators for controlling the transmission of said waves therefrom, timing means coupled to said gates producing recurring pulse groups with each group corresponding to a pulse of said train and including a plurality of pulse components in predetermined time positions, means applying each of said pulse components to one of said gates for operating the same to transmit waves from the associated oscillator, whereby a coded pulse group is transmitted including a plurality of pulse components of different frequencies in predetermined time positions to form an address, and receiver means including a mixer, a radio frequency amplifier for applying received waves to said mixer, a plurality of oscillators for producing waves related in frequency to the pulse components of a particular address, a plurality of receiver gates individually coupling said oscillators to said mixer, receiver timing means coupled to said receiver gates and applying pulses for operating the same at predetermined time positions corresponding to said particular address, said receiver timing means being controlled to produce recurring pulse groups having a repetition rate differing from the repetition rate of the transmitted pulse groups, a fixed tuned intermediate frequency amplifier coupled to said mixer and producing an output only when the received pulse components and the oscillations applied to said mixer have a predetermined frequency relation, detector means coupled to said intermediate frequency amplifier for producing an output pulse in response to an intermediate frequency output resulting from a received pulse component, means coupled to said detector means for utilizing said output pulses, selector means coupled to said detector means for selecting the smallest pulse component of the received coded pulse group, automatic frequency control means coupled to said selector means and to said receiver timing means for controlling the repetition rate of the pulse groups of said receiver timing means to open said gates in synchronization with the received coded pulse groups, and automatic gain control means coupled to said selector means for controlling the gain of said radio frequency amplifier and said intermediate frequency amplifier.

6. A communication system including in combination, transmitter means including means for providing a train of pulses having a regular time relation with the presence and absence of such pulses constituting the information to be transmitted, a plurality of oscillators for producing waves of different frequencies, a plurality of gates individually coupled to said oscillators for controlling the transmission of said waves therefrom, selector means coupled to said gates producing recurring pulse groups with each group corresponding to a pulse of said train and including a plurality of pulse components in predetermined time positions, means applying each of said pulse components to one of said gates for operating the same to transmit waves from the associated oscillator, whereby a coded pulse group is transmitted including a plurality of pulse components of different frequencies in predetermined time positions to form an address, and receiver means including a mixer, a radio frequency amplifier for applying received waves to said mixer, a plurality of oscillators for producing waves related in frequency to the pulse components of a particular addess, a plurality of receiver gates individually coupling said oscillators to said mixer, timing means coupled to said receiver gates for operating the same at predetermined time positions corresponding to said particular address, said timing means being controlled to produce recurring pulse groups having a repetition rate differing from the repetition rate of the transmitted pulse groups, a fixed tuned intermediate frequency amplifier coupled to said mixer and producing an output when the received pulse components and the oscillations applied to said mixer have a predetermined frequency relation, detector means coupled to said intermediate frequency amplifier for producing an output pulse in response to reception of each pulse component from said intermediate frequency amplifier, means coupled to said detector means for utilizing said output pulses, selector means coupled to said detector means including a biased amplifier for producing a control pulse when the pulse from said detector exceeds a predetermined value, means responsive to said control pulse for blocking said selector means whereby only pulses below a given value are transmitted thereby, automatic frequency control means coupled to said selector means and to said timing means for holding the pulse groups from said timing means in sychronization with the received coded pulse groups, and automatic gain control means coupled to selector means and responsive to the pulses transmitted thereby for controlling the level at which said biased amplifier produces an output pulse, said automatic gain control means being coupled to said radio frequency amplifier and said intermediate frequency amplifier for controlling the gain thereof.

7. A communication system including in combination transmitter means including delta modulator means for producing a train of pulses having a regular timed relation with the presence and absence of such pulses constituting the information to be transmitted, a plurality of oscillators for producing waves of different frequencies, a plurality of gates individually coupled to said oscillators for controlling the transmission of said waves therefrom, selector means producing recurring pulse groups with each group corresponding to a pulse from said modulator means and including a plurality of pulse components arranged in a predetermined timed sequence, means applying each of said pulse components to one of said gates for operating the same to transmit the wave from the associated oscillator, whereby a coded pulse group is transmitted including a plurality of pulse components of different frequencies and in predetermined time positions to form an address, and receiver means for receiving transmitted pulses including a mixer, a plurality of oscillators for producing waves related in frequency to the pulse components of a particular address, a plurality of receiver gates individually coupling said oscillators to said mixer, timing means synchronized with said selector means of said transmitter coupled to said receiver gates for operating the same at time positions corresponding to the time position of the particular address, a fixed tuned intermediate frequency amplifier for producing an output only when the received wave and the oscillations coupled to said mixer have a predetermined frequency relation, detector means coupled to said intermediate frequency amplifier for producing an output pulse in response to each coded pulse component which produces an output from said intermediate amplifier, counter means coupled to said detector means for producing a modulation pulse when all components of a coded pulse group are received, and delta modulation processing means coupled to said counter means.

8. A communication system including in combination, transmitter means including delta modulator means for producing a train of pulses having a regular timed relation with the presence and absence of such pulses constituting the information to be transmitted, a plurality of oscillators for producing waves of different frequencies, a plurality of gates individually coupled to said oscillators for controlling the transmission of said waves therefrom, selector means producing recurring pulse groups with each group corresponding to a pulse from said modulator means and including a plurality of pulse components arranged in a predetermined timed sequence, and means applying each of said pulse components to one of said gates for operating the same to transmit the wave from the associated oscillator, whereby a coded pulse group is transmitted including a plurality of pulse components of different frequencies and in predetermined time positions to form an address, and receiver means including a mixer for receiving transmitted waves, a plurality of oscillators for producing waves related in frequency to the pulse components of a particular address, a plurality of receiver gates individually coupling said oscillators to said mixer, timing means coupled to said receiver gates for operating the same at time positions corresponding to the time positions of said particular address, a fixed tuned intermediate frequency amplifier for producing an output when the received pulse components and the oscillations coupled to said mixer have a predetermined frequency relation, detector means coupled to said intermediate frequency amplifier for producing a pulse component in response to each coded pulse component which produces an output from said intermediate frequency amplifier, delta modulation processing means coupled to said detector means, selector means responsive to pulse components from said detector means which fall below a given level, automatic frequency control means coupled to said selector means for controlling said timing means so that said receiver gates are operated in synchronization with the received pulse groups, and automatic gain control means coupled to said selector means for controlling the gain of said intermediate frequency amplifier.

9. A transmitter-receiver communication unit including in combination, transmitter means including means for providing a train of pulses having a regular timed relation with the presence and absence of such pulses constituting the information to be transmitted, a plurality of oscillators for producing waves of different frequencies, a plurality of gates individually coupled to said oscillators for controlling the transmission of said waves therefrom, selector means coupled to said oscillators for controlling the frequency thereof, clock means including first and second oscillators and means coupled thereto providing a clock pulse wave having a frequency equal to the difference between the frequencies of said oscillators, said clock means including a plurality of cascade connected divider means each providing a pulse wave having a frequency equal to one-half that of the applied pulse wave, timing means connected to said clock, means for providing predetermined time positions, said selector means being coupled to said timing means and producing recurring pulse groups with each group corresponding to a pulse of said train and including a plurality of pulse components in predetermined time positions, means applying each of said pulses to one of said gates to operate the same to transmit waves from the associated oscillator, whereby a coded pulse group is transmitted including a plurality of pulse components of different frequencies and in different time positions to form an address, and receiver means including a mixer for receiving transmitted waves, a plurality of oscillators for producing waves related in frequency to the pulse components of a particular address, a plurality of receiver gates individually coupling said oscillators to said mixer, means coupling said timing means to said receiver gates for operating the same at predetermined time position corresponding to the particular address, control means coupled to said first oscillator for controlling the frequency thereof so that said timing means applies recurring pulse groups to said receiver gates having a repetition rate differing from the repetition rate of the transmitted pulse groups, a fixed tuned intermediate frequency amplifier for producing an output when the received pulse components and the oscillations coupled to said mixer have a predetermined frequency relation, detector means coupled to said intermediate frequency amplifier for producing an output pulse in response to each coded pulse component which produces an output from said intermediate frequency amplifier, and automatic frequency control means coupled to said detector means and to first oscillator for controlling the frequency of said first oscillator so that said timing means operates said receiver gates in synchronization with the received coded pulse groups.

10. A transmitter-receiver communication unit including in combination, transmitter means including means for providing a train of pulses having a regular time relation with the presence and absence of such pulses constituting the information to be transmitted, a plurality of oscillators for producing waves of different frequencies, a plurality of transmitter gates individually coupled to said oscillators for controlling the transmission of said waves therefrom, clock means for producing regular timed intervals, timing means coupled to said clock means for producing recurring pulse groups, selector means coupled to said timing means for providing a pulse group for each pulse of said train with each group including a plurality of pulse components in predetermined time positions and means applying each of said pulse components to one of said gates to operate the same to transmit waves from the associated oscillator, whereby a coded pulse group is transmitted including a plurality of pulse components of different frequencies in predetermined time positions to form an address, and receiver means including a mixer, a radio frequency amplifier for applying received waves to said mixer, a plurality of oscillators for producing waves related in frequency to the pulse components of a particular address, a plurality of receiver gates individually coupling said oscillators to said mixer, means coupling said timing means to said receiver gates for operating the same at predetermined time positions corresponding to the particular address, said clock means being controlled so that said timing means applies recurring pulse groups to said receiver gates having a repetition rate differing from the repetition rate of the pulse groups applied thereby to said transmitter gates, a fixed tuned intermediate frequency amplifier coupled to said mixer for producing an output when the received pulse components and the oscillations coupled to said mixer have a predetermined frequency relation, detector means coupled to said intermediate frequency amplifier for producing an output pulse in response to each coded pulse component which produces an output from said intermediate frequency amplifier, automatic frequency control means coupled to said detector means and to said clock means for controlling said clock means and thereby holding the pulse groups applied by said receiver timing means to said receiver gates in synchronization with the received coded pulse groups, and automatic gain control means coupled to said detector means for controlling the gain of said radio frequency amplifier and said intermediate frequency amplifier.

11. A transmitter-receiver communication unit including in combination, transmitter means including modulator means for providing a train of pulses having a regular time relation with the presence and absence of such pulses constituting the information to be transmitted, a plurality of oscillators for producing waves of different frequencies, a plurality of transmitter gates individually coupled to said oscillators for controlling the transmission of said waves therefrom, timing means producing recurring pulse groups, selector means coupled to said timing means and said modulator means for providing a pulse group for each pulse of said train which includes a plurality of pulse components in predetermined time positions, and means applying each of said pulse components to one of said gates to operate the same to transmit waves from the associated oscillators, whereby a coded pulse group is transmitted including a plurality of pulse components of different frequencies in predetermined time positions to form an address, and receiver means including a mixer, means for applying received waves to said mixer, a plurality of oscillators for producing waves related in frequency to the pulse components of a particular address, a plurality of receiver gates individually coupling said oscillator to said mixer, means coupling said timing means to said receiver gates for operating the same at predetermined time positions corresponding to the particular address, a fixed tuned intermediate frequency amplifier coupled to said mixer for producing an output when the received pulse component and the oscillations coupled to said mixer have a predetermined frequency relation, detector means coupled to said intermediate frequency amplifier for producing an output pulse in response to each coded pulse component which produces an output from said intermediate frequency amplifier, and automatic frequency control means coupled to said detector means and to said timing means for holding the pulse groups applied to said receiver timing means in synchronization with the received coded pulse groups.

12. Transmitter apparatus including in combination, means for providing a train of pulses having a regular timed relation with the presence and absence of such pulses constituting the information to be transmitted, a plurality of oscillators for producing waves of different frequencies, a plurality of gates individually coupled to said oscillators for controlling the transmission of said waves therefrom, selector means coupled to said oscillators for controlling the frequency thereof, clock means including first and second oscillators and means coupled thereto providing a clock pulse wave having a frequency equal to the difference between the frequencies of said oscillators, said clock means including a plurality of cascade connected frequency divider means, each of said frequency divider means having an input and an output and providing a pulse wave at said output thereof having a frequency equal to one-half that of the pulse wave applied to the input thereof, timing means connected to said clock means and operating in timed relation therewith, said selector means being coupled to timing means and producing recurring pulse groups with each group corresponding to a pulse of said train and including a plurality of pulse components in predetermined time positions, and means coupling said selector means to said gates for applying each of said pulse components to one of said gates to operate the same to transmit waves from the associated oscillator, whereby a coded pulse group is transmitted including a plurality of pulse components of different frequencies and in predetermined time positions to form an address.

13. Transmitter apparatus including in combination, means for providing a train of pulses having a regular time relation with the presence and absence of such pulses constituting the information to be transmitted, a plurality of oscillators for producing waves of different frequencies, a plurality of gates individually coupled to said oscillators for controlling the transmission of said waves therefrom, selector means producing recurring pulse groups with each group corresponding to a pulse of said train and including a plurality of pulse components in predetermined time positions, and means for applying each of said pulse components to one of said gates to operate the same to transmit waves from the associated oscillator, whereby a train of coded pulse groups is transmitted, with each pulse group, including a plurality of pulse components of different frequencies in predetermined time positions to form an address, and said train of pulse groups providing the transmitted information.

14. In a communication system wherein coded pulse groups are transmitted each including a plurality of pulse components of different frequencies in predetermined time positions to form an address, a receiver including in combination, a mixer, a radio frequency amplifier for applying received waves to said mixer, a plurality of oscillators for producing waves related in frequency to the pulse components of a particular address, a plurality of gates individually coupling said oscillators to said mixer, timing means coupled to said gates for operating the same at predetermined time positions corresponding to the time position of said pulse components of said particular address, a fixed tuned intermediate frequency amplifier coupled to said mixer and producing an output when the received pulse components and the oscillations applied to said mixer have a predetermined frequency relation, detector means coupled to said intermediate frequency amplifier for producing an output pulse in response to each pulse component which produces an output from said intermediate frequency amplifier, selector means coupled to said detector means including a biased amplifier for producing a control pulse when the pulse from said detector exceeds a predetermined value, means responsive to said control pulse for blocking said selector means whereby only pulses below a given value are transmitted thereby, and automatic gain control means coupled to said selector means and providing a control voltage in response to the pulses from said selector means said automatic gain control means being coupled to said biased amplifier and applying said control voltage thereto for controlling the level at which said biased amplifier produces an output pulse, said automatic gain control means being coupled to said radio frequency amplifier and said intermediate frequency amplifier for controlling the gain thereof.

15. In a communication system wherein coded pulse groups are transmitted each including a plurality of pulse components of different frequencies in predetermined time positions to form an address, a receiver including in combination, a mixer, means for applying received waves to said mixer, a plurality of oscillators for producing waves related in frequency to the pulse components of a particular address, a plurality of gates individually coupling said oscillators to said mixer, timing means coupled to said gates for operating the same at predetermined time positions corresponding to said particular address, a fixed tuned intermediate frequency amplifier coupled to said mixer and producing an output when the received pulse components and the oscillations applied to said mixer have a predetermined frequency relation, detector means coupled to said intermediate frequency amplifier for producing an output pulse in response to each pulse component which produces an output from said intermediate frequency amplifier, selector means coupled to said detector means for selecting pulses below a given value, automatic gain control means coupled to selector means and responsive to the pulses transmitted thereby, said automatic gain control means being coupled to said intermediate frequency amplifier for controlling the gain thereof, and automatic frequency control means coupled to said selector means and responsive to the pulses selected thereby for controlling said timing means so that said gates are operated in synchronization with the received pulse groups.

16. A communication system including in combination, transmitter means including modulator means for providing a train of modulation pulses having a regular timed relation, with the presence and absence of such pulses constituting the information to be transmitted, oscillator means for producing waves of different frequencies, control means coupled to said modulator means and to said oscillator means for controlling the transmission of said waves therefrom to provide for each modulation pulse a coded address pulse group including pulse components of different frequencies and in predetermined time positions to form an address; and receiver means responsive to a particular address and including mixer means to which received coded pulse groups are applied, local oscillator means for producing local oscillations related in frequency to the frequencies of the pulse components of the coded pulse group forming the particular address, control means coupling said local oscillator means to said mixer means for applying thereto said local oscillations at predetermined times corresponding to the time positions of said pulse components of the coded pulse group forming the particular address, fixed tuned intermediate frequency amplifier means coupled to said mixer means for producing an output only when the received pulse component has a predetermined frequency relation with the local oscillations simultaneously applied to said mixer means, and detector means coupled to said intermediate frequency amplifier and responsive to the output thereof for producing an output modulation pulse in response to reception of all pulse components of the coded pulse group forming the particular address, said intermediate frequency amplifier means rejecting signals from said mixer means in the absence of local oscillations and when signals applied to said mixer have a frequency relation with said local oscillations differing from said predetermined frequency relation and preventing application of such signals to said detector means.

17. A receiver for use in a communication system wherein information is transmitted as a train of coded address pulse groups having a regular timed relation, with the presence and absence of such pulse groups constituting the information to be transmitted, and each pulse group including components of different frequencies in predetermined time positions to distinguish the address, such receiver including in combination, mixer means, local oscillator means producing local oscillations of different frequencies related to the frequencies of the components of a particular coded address pulse group, control means coupling said oscillator means to said mixer means for applying local oscillations thereto at predetermined times so that said mixer means provides components of fixed frequency in response to the simultaneous application of address pulse components having frequencies which differ by said fixed frequency from the frequency of said local oscillations, fixed tuned intermediate frequency amplifier means coupled to said mixer means for amplifying said fixed frequency components, said intermediate frequency amplifier means rejecting signals from said mixer means in the absence of local oscillations and rejecting signals applied to said mixer means having a frequency differing from the frequency of the local oscillations by an amount other than said fixed frequency, detector means coupled to said intermediate frequency amplifier means for detecting said fixed frequency components, and means coupled to said detector means and responsive to said detected pulse components to provide an output pulse when all components of a coded address pulse group are received.

18. A communication system including in combination, transmitter means including modulator means for providing a train of modulation components representing information to be transmitted, oscillator means for producing waves of different frequencies, control means coupled to said modulator means and to said oscillator means for controlling the transmission of said waves therefrom to provide for each modulation component oscillation bursts of particular frequency and time relationships to form an address; and receiver means including mixer means to which received oscillation bursts are applied, local oscillator means coupled to said mixer means for applying thereto bursts of local oscillations related in frequency and time to the oscillation bursts forming a particular address, fixed tuned intermediate frequency amplifier means coupled to said mixer means for producing on output only when a received oscillation burst has a predetermined frequency relation with the local oscillation burst simultaneously applied to said mixer means, and detector means coupled to said intermediate frequency amplifier means and responsive to the output thereof for deriving the train of modulation components transmitted.

19. A radio communication system including in combination, modulation means for producing a train of modulation pulses having a regular timed relation with the presence and absence of such modulation pulses constituting the information to be transmitted, oscillator means for producing a plurality of oscillations of different frequencies, control means coupled to said modulation means and said oscillator means for forming from each modulation pulse a coded address pulse group including selected components of the oscillations of a plurality of frequencies in a plurality of time positions, with each different combination of frequencies and time positions forming a different address, transmitter means for transmitting the train of coded address pulse groups, receiver means for receiving said coded address pulse groups and including local oscillator means for producing oscillations of different frequencies and in different time positions related to the frequencies and time positions of the components of a particular address pulse group, mixer means coupled to said local oscillator means for mixing the components of the received pulse groups with the local oscillations to provide pulse components of fixed frequency in response to the simultaneous application of pulse components and local oscillations having frequencies which differ by said fixed frequency, intermediate frequency amplifier means for selecting components of received pulse groups which differ in frequency from the local oscillations by said fixed frequency, detector means for detecting the fixed frequency pulse components, and counter means connected to said receiver means for counting the detected pulse components to provide an output pulse when all components of an address pulse group are received.

20. A radio communication system including in combination, modulator means for producing a train of modulation pulses having regular timed intervals, with the presence and absence of such modulation pulses constituting the information to be transmitted, clock means coupled to said modulator means for controlling the time intervals of said modulation pulses, oscillator means for producing a plurality of oscillations of different frequencies, gate means coupled to said modulator means for forming a coded address pulse group for each modulation pulse produced thereby, said gate means being coupled to said clock means and to said oscillator means and being controlled by said clock means to provide pulse groups including selected components of the oscillations of a plurality of frequencies in a plurality of time positions, with each different combination of frequencies and time positions forming a different address, and means for transmitting the train of coded address pulse groups, and receiver means for receiving said coded address pulse groups, said receiver means including selector means for selecting pulse groups having components of frequencies and in time positions of a particular address, and detector means for detecting the selected pulse groups to reproduce the train of modulation pulses.

References Cited by the Examiner

UNITED STATES PATENTS

| | | | |
|---|---|---|---|
| 2,635,228 | 4/1953 | Purington | 340—171 X |
| 2,740,106 | 3/1956 | Phelps | 325—55 |
| 2,897,275 | 7/1959 | Bowers. | |
| 3,035,250 | 5/1962 | Durkee | 340—171 X |
| 3,141,928 | 7/1964 | Davey et al. | 325—55 X |
| 3,160,711 | 12/1964 | Schroeder | 325—55 X |
| 3,197,563 | 7/1965 | Hamsher et al. | 340—171 X |
| 3,239,761 | 3/1966 | Goode | 325—22 |

DAVID G. REDINBAUGH, *Primary Examiner.*

STEPHEN W. CAPELLI, *Examiner.*

E. C. MULCAHY, JR., J. W. CALDWELL, *Assistant Examiners.*